(12) United States Patent
Nakayama et al.

(10) Patent No.: US 10,549,619 B2
(45) Date of Patent: Feb. 4, 2020

(54) VEHICLE BATTERY UNIT (71) Applicant: HONDA MOTOR CO., LTD., Tokyo (JP)

(72) Inventors: Shinya Nakayama, Saitama (JP); Harumi Takedomi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/571,150

(22) PCT Filed: May 23, 2016

(86) PCT No.: PCT/JP2016/065214
§ 371 (c)(1),
(2) Date: Nov. 1, 2017

(87) PCT Pub. No.: WO2016/194684
PCT Pub. Date: Dec. 8, 2016

(65) Prior Publication Data
US 2018/0170165 A1 Jun. 21, 2018

(30) Foreign Application Priority Data
Jun. 4, 2015 (JP) .................................. 2015-113855

(51) Int. Cl.
*B60K 1/04* (2019.01)
*H01M 2/10* (2006.01)
*H01M 2/02* (2006.01)

(52) U.S. Cl.
CPC ............. *B60K 1/04* (2013.01); *H01M 2/0237* (2013.01); *H01M 2/1077* (2013.01);
(Continued)

(58) Field of Classification Search
CPC ............. B60K 2001/0438; B60K 1/04; H01M 2/0237; H01M 2/1077; H01M 2/1083; H01M 2220/20
See application file for complete search history.

(56) References Cited

U.S. PATENT DOCUMENTS 6,326,103 B1 12/2001 Ido et al.
2009/0145676 A1 6/2009 Takasaki et al.
(Continued)

FOREIGN PATENT DOCUMENTS

CN 201347134 Y 11/2009
CN 101734132 A 6/2010
(Continued)

OTHER PUBLICATIONS

Jul. 12, 2016, International Search Report issued for related international application No. PCT/JP2016/065214.
(Continued)

*Primary Examiner* — Miriam Stagg
*Assistant Examiner* — Lilia Nedialkova
(74) *Attorney, Agent, or Firm* — Paratus Law Group, PLLC (57) ABSTRACT

In a battery unit 10 in which plural high-voltage batteries 31a to 33a are accommodated in a battery case 50, the battery case 50 includes: a bottom plate 51A on which the batteries 31a to 33a are mounted; and a cover 52 covering the batteries 31a to 33a from above. The bottom plate 51A includes a tray 54 having a plate shape, lengthwise reinforcing members 55, and brackets 53. The lengthwise reinforcing members 55 are disposed so as to connect at least adjacent brackets 53. The lengthwise reinforcing members 55 and the brackets 53 are disposed in a lattice shape with the tray 54 interposed therebetween. The batteries 31a to 33a are fixed to the lengthwise reinforcing members 55 such
(Continued)

that a longitudinal direction thereof faces the vehicle width direction. The battery case 50 is fixed under a floor of a vehicle V by the brackets 53.

3 Claims, 7 Drawing Sheets

(52) U.S. Cl.
CPC ... *H01M 2/1083* (2013.01); *B60K 2001/0438* (2013.01); *H01M 2220/20* (2013.01)

(56) References Cited

U.S. PATENT DOCUMENTS

| | | | |
|---|---|---|---|
| 2009/0186266 | A1 | 7/2009 | Nishino et al. |
| 2010/0190044 | A1 | 7/2010 | Nishino et al. |
| 2012/0156539 | A1 | 6/2012 | Honjo et al. |
| 2013/0045398 | A1 | 2/2013 | Katano et al. |
| 2013/0192914 | A1* | 8/2013 | Nakamori ............... B60K 1/04 180/68.5 |
| 2013/0248263 | A1 | 9/2013 | Umetani |
| 2013/0306387 | A1 | 11/2013 | Katano et al. |
| 2014/0124278 | A1 | 5/2014 | Takamura et al. |

FOREIGN PATENT DOCUMENTS

| | | |
|---|---|---|
| CN | 102569693 A | 7/2012 |
| CN | 103118890 A | 5/2013 |
| CN | 103318005 A | 9/2013 |
| CN | 103347724 A | 10/2013 |
| CN | 104443039 A | 3/2015 |
| JP | H09-156380 A | 6/1997 |
| JP | H10-006785 A | 1/1998 |
| JP | 2000-149900 A | 5/2000 |
| JP | 2009-137408 A | 6/2009 |
| JP | 2013-012480 A | 1/2013 |
| JP | 2013-133044 A | 7/2013 |
| JP | 2013-251269 A | 12/2013 |
| JP | 2014-075348 A | 4/2014 |
| JP | 2014-094616 A | 5/2014 |
| JP | 2015-097170 A | 5/2015 |

OTHER PUBLICATIONS

Jun. 14, 2016, International Search Opinion issued for related international application No. PCT/JP2016/065214.

May 14, 2019, Japanese Office Action issued for related JP Application No. 2017-521825.

Aug. 20, 2019, Chinese Office Action issued for related CN Application No. 201680028474.4.

* cited by examiner

VEHICLE BATTERY UNIT

CROSS REFERENCE TO PRIOR APPLICATION

This application is a National Stage Patent Application of PCT International Patent Application No. PCT/JP2016/065214 (filed on May 23, 2016) under 35 U.S.C. § 371, which claims priority to Japanese Patent Application No. 2015-113855 (filed on Jun. 4, 2015), which are all hereby incorporated by reference in their entirety.

TECHNICAL FIELD

The present invention relates to a vehicle battery unit mounted on a vehicle.

BACKGROUND ART

In a vehicle such as a hybrid vehicle, an electric vehicle, or a fuel cell vehicle, a battery unit in which a plurality of batteries are accommodated in a battery case is provided. In a battery unit described in Patent Literature 1, a battery case includes: a tray on which batteries are mounted; and a cover that covers the batteries from above, and a plurality of beam members that extend in a vehicle width direction are fixed to a lower surface of the tray. The battery unit is fixed to left and right side members through fastening portions of the beam members exposed from the tray in the vehicle width direction. In addition, in a battery accommodation portion of the tray, front-rear-direction partitions and width-direction partitions are provided in a lattice shape to be integrated with the tray. As a result, battery accommodation chambers that accommodate the batteries are divided, and the rigidity of the tray is secured.

PRIOR ART LITERATURE

Patent Literature

Patent Literature 1: JP-A-2013-12480

SUMMARY OF THE INVENTION

Problem that the Invention is to Solve

However, in the battery unit described in Patent Literature 1, the rigidity in the front-rear-direction is secured by the front-rear-direction partitions that are formed to be integrated with the tray. Therefore, a shape of the tray becomes complicated, and a manufacturing step may become complicated.

The present invention provides a battery unit that can reliably hold batteries and can realize structural simplification and weight reduction of a tray.

Means for Solving the Problem

The present invention provides the following aspects.

According to a first aspect, there is provided a vehicle battery unit (for example, a battery unit 10 in an embodiment described below) including:

a plurality of batteries (for example, high-voltage batteries 31a to 33a in the embodiment described below); and a battery case (for example, a battery case 50 in the embodiment described below) that accommodates the batteries, wherein the battery case includes a bottom plate (a bottom plate 51A or 51B in the embodiment described below) on which the batteries are mounted and a cover (for example, a cover 52 in the embodiment described below) that covers the batteries from above, the bottom plate includes a tray (for example, a tray 54 or 64 in the embodiment described below) that has a plate shape, a plurality of lengthwise reinforcing members (for example, lengthwise reinforcing members 55 or 65 in the embodiment described below) that are provided on an upper surface of the tray and that extend in a front-rear-direction of a vehicle, and a plurality of lateral reinforcing members (for example, brackets 53 or 63 in the embodiment described below) that are provided on a lower surface of the tray and that extend in a vehicle width direction of the vehicle, the lengthwise reinforcing members are disposed so as to connect at least adjacent lateral reinforcing members, the lengthwise reinforcing members and the lateral reinforcing member are disposed in a lattice shape with the tray interposed therebetween, the batteries are fixed to the lengthwise reinforcing members such that a longitudinal direction of the batteries faces the vehicle width direction, and the battery case is fixed under a floor of the vehicle by the lateral reinforcing members.

According to a second aspect, in the vehicle battery unit according to the first aspect, in the battery case, a first battery module (for example, a front battery module 31 in the embodiment described below) and a second battery module (for example, a lower rear battery module 32 in the embodiment described below) that include the batteries are disposed apart from each other in the front-rear-direction with a space portion (for example, a space portion 34 in the embodiment described below) interposed therebetween, a front seat (for example, a front seat 4 in the embodiment described below) is disposed above the first battery module, a rear seat (for example, a rear seat 5 in the embodiment described below) is disposed above the second battery module, and each of the first battery module and the second battery module is disposed between a pair of the lateral reinforcing members.

According to a third aspect, in the vehicle battery unit according to the second aspect, a high-voltage device (for example, a DC-DC converter 22 in the embodiment described below) is disposed in the space portion, and the high-voltage device is fixed to the lengthwise reinforcing member (for example, first and second middle lengthwise reinforcing members 55E and 55F or a second lengthwise reinforcing member 65B in the embodiment described below).

According to a fourth aspect, in the vehicle battery unit according to the third aspect, a pair of the lateral reinforcing members (for example, a second bracket 53B and a third bracket 53C, or a second bracket 63B and a third bracket 63C in the embodiment described below) are provided in a front-rear-direction of the high-voltage device, at least one cross member (for example, a front cross member 56A and a rear cross member 56B, or a cross member 68 in the embodiment described below) is provided along the lateral reinforcing member on the upper surface of the tray, and the lengthwise reinforcing member that hold the high-voltage device is fixed to the cross member.

According to a fifth aspect, in the vehicle battery unit according to the fourth aspect, the at least one cross member is disposed so as to overlap with one of the pair of the lateral reinforcing members, which interpose the high-voltage device therebetween, in a top view, and a closed space is formed by the cross member and the one of the pair of the lateral reinforcing members.

Advantage of the Invention

According to the first aspect, the lengthwise reinforcing members and the lateral reinforcing members are disposed in a lattice shape with the tray interposed therebetween. As a result, the rigidity of the bottom plate can be improved without increasing the thickness of the tray or without imparting rigidity to the tray, and thus the structural simplification and weight reduction of the tray can be realized. In addition, the batteries can be reliably held by the lengthwise reinforcing members that connect the lateral reinforcing members. Further, the lateral reinforcing members not only function as reinforcing members but also function as a fastening member. As a result, the battery unit can be fixed under the floor of the vehicle through the lateral reinforcing members, the number of components can be reduced, and the assembly can be easily performed, as compared to a case where a fastening member is separately provided.

According to the second aspect, each of the first battery module and the second battery module is disposed between the pair of lateral reinforcing members. As a result, the batteries can be held in a lattice-shaped space with high rigidity.

In addition, in the vehicle battery unit, the space portion is formed between the front seat and the rear seat. Therefore, an influence on the interior space can be avoided. As a result, an operation of a passenger of the rear seat putting a foot into or out from under the front seat is not interrupted, and the passenger comfort can be secured.

According to the third aspect, the high-voltage device that is fixed to the lengthwise reinforcing member is interposed between the first battery module and the second battery module in the front-rear-direction. Therefore, the high-voltage device can be effectively protected from impact during collision or the like.

According to the fourth aspect, the high-voltage device can be more reliably protected by the cross member that is disposed on the upper surface of the tray. In addition, the rigidity of the bottom plate can be further improved by the cross member.

According to the fifth aspect, a closed space is formed by the cross member and the one of the pair of the lateral reinforcing members between which the high-voltage device is interposed. As a result, the batteries and the high-voltage device can be more reliably held with high rigidity.

MODE FOR CARRYING OUT THE INVENTION

Hereinafter, an embodiment of a vehicle battery unit according to the present invention will be described with reference to the accompanying drawings. It should be noted that the drawings are seen such that reference numerals look properly oriented.

[Battery Unit]

Figure 1:
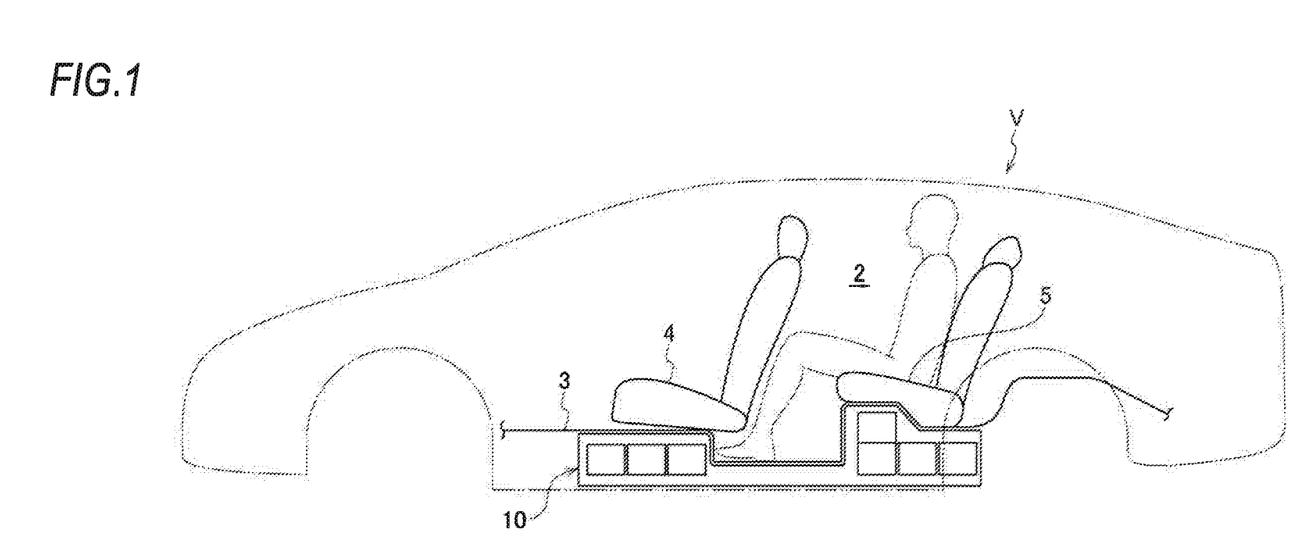
FIG. 1 is a schematic side view illustrating a vehicle on which a vehicle battery unit according to an embodiment of the present invention is mounted.
Figure 2:
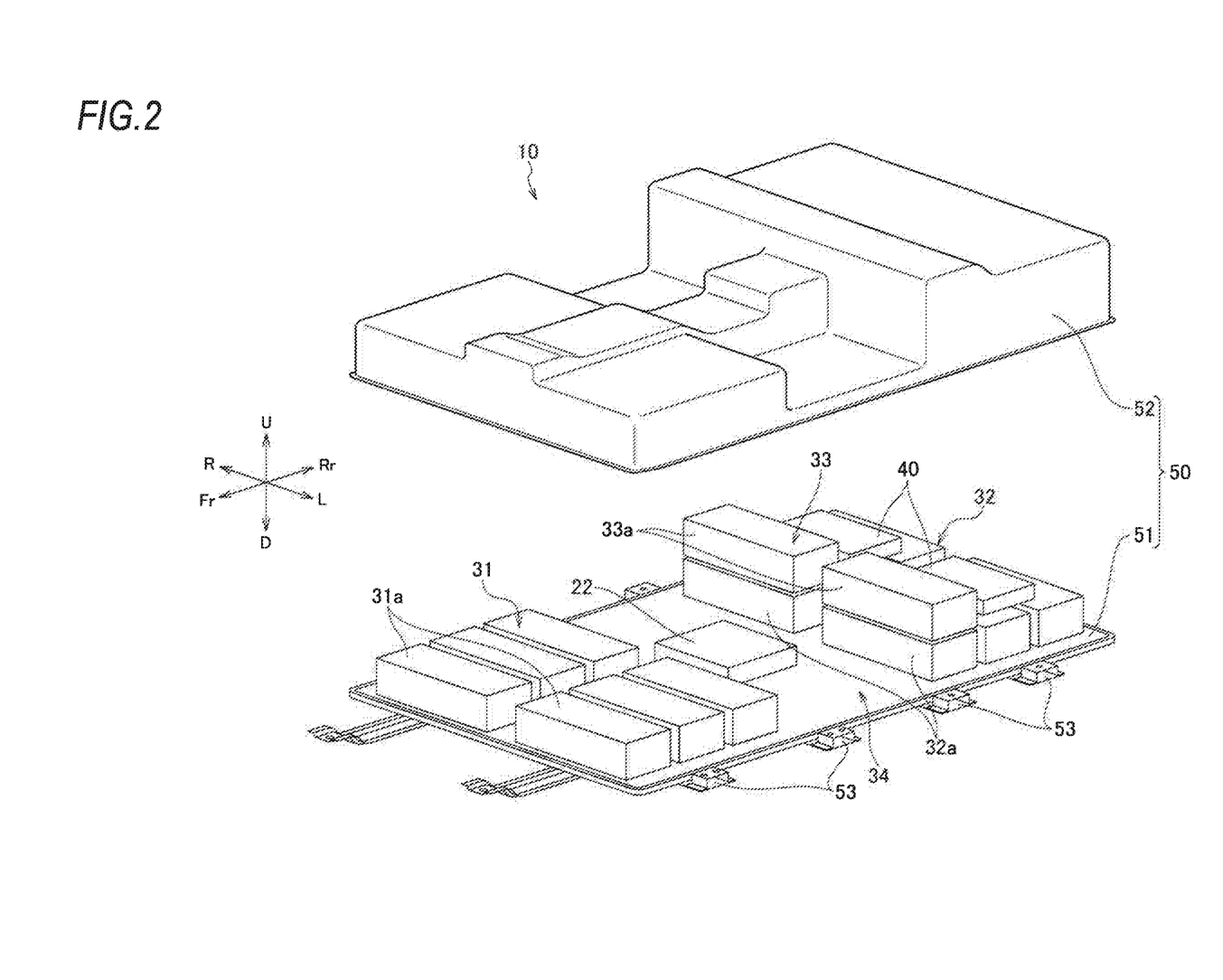
FIG. 2 is an exploded perspective view illustrating the battery unit according to a first embodiment of the present invention.

As illustrated in FIGS. 1 and 2, a battery unit 10 according to the embodiment of the present invention mainly includes: a plurality of battery modules 31 to 33, a DC-DC converter 22, a battery ECU 40, and a battery case 50 that accommodates the above-described components, and is mounted on a vehicle V such as a hybrid vehicle, an electric vehicle, or a fuel cell vehicle. The battery unit 10 is disposed under a floor panel 3 forming a floor of a passenger compartment 2.

[Battery Case]

The battery case 50 includes: a bottom plate 51 on which the plurality of battery modules 31 to 33, the DC-DC converter 22, and the battery ECU 40 are mounted; and a cover 52 that covers the bottom plate 51 from above. In the battery case 50, a plurality of brackets 53 (in a second embodiment, brackets 63) that form a part of the bottom plate 51 and that horizontally extend are fastened to floor frames (not illustrated) that are provided inside side sills disposed on opposite sides of the vehicle V. As a result, the battery unit 10 is attached to be suspended under the floor panel 3. The detailed configuration of the bottom plate 51 will be described below.

[Battery]

The battery modules 31 to 33 include: a front battery module 31 that is accommodated in a front portion of the battery case 50; and two rear battery modules 32 and 33 which are accommodated in a rear portion of the battery case 50 with a space portion 34 from the front battery module 31. Each of the battery modules 31 to 33 includes a plurality of high-voltage batteries 31a to 33a. In the embodiment, the front battery module 31 includes six high-voltage batteries 31a in total that are disposed in two lines in a left-right direction and in three lines in a front-rear-direction. Likewise, one rear battery module 32 (hereinafter, also called "lower rear battery module 32") includes six high-voltage batteries 32a in total that are disposed in two lines in the left-right direction and in three lines in the front-rear-direction. The other rear battery module 33 (hereinafter, also called "upper rear battery module 33") includes two high-voltage batteries 33a that are disposed in the left-right direction.

The battery modules 31 to 33 are disposed under a front seat 4 and a rear seat 5 of the vehicle V (refer to FIG. 1). Specifically, the front battery module 31 is disposed under the front seat 4, and the lower rear battery module 32 and the upper rear battery module 33 are disposed under the rear seat 5.

When the front battery module 31 is disposed under the front seat 4, the front battery module 31 is placed flat without overlapping. When the lower rear battery module 32 and the upper rear battery module 33 are disposed under the rear seat 5, the lower rear battery module 32 and the upper rear battery module 33 are vertically disposed in a front portion of a seating surface of the rear seat 5. Specifically, the two high-voltage batteries 33*a* constituting the upper rear battery module 33 are disposed above two high-voltage batteries 32*a* which are disposed on the most front side among the six high-voltage batteries 32*a* constituting the lower rear battery module 32.

The DC-DC converter 22 is a high-voltage device that converts a voltage of a direct, and is disposed at the center of the battery unit 10 in the width direction and in the space portion 34 between the front battery module 31 and the rear battery modules 32 and 33. In addition, the battery ECU 40 is a battery controller that manages charging and discharging of the high-voltage batteries 31*a* to 33*a* and temperatures thereof, and is disposed above the lower rear battery module 32 and in rear of the upper rear battery module 33.

Bottom Plate

First Embodiment

Figure 3:
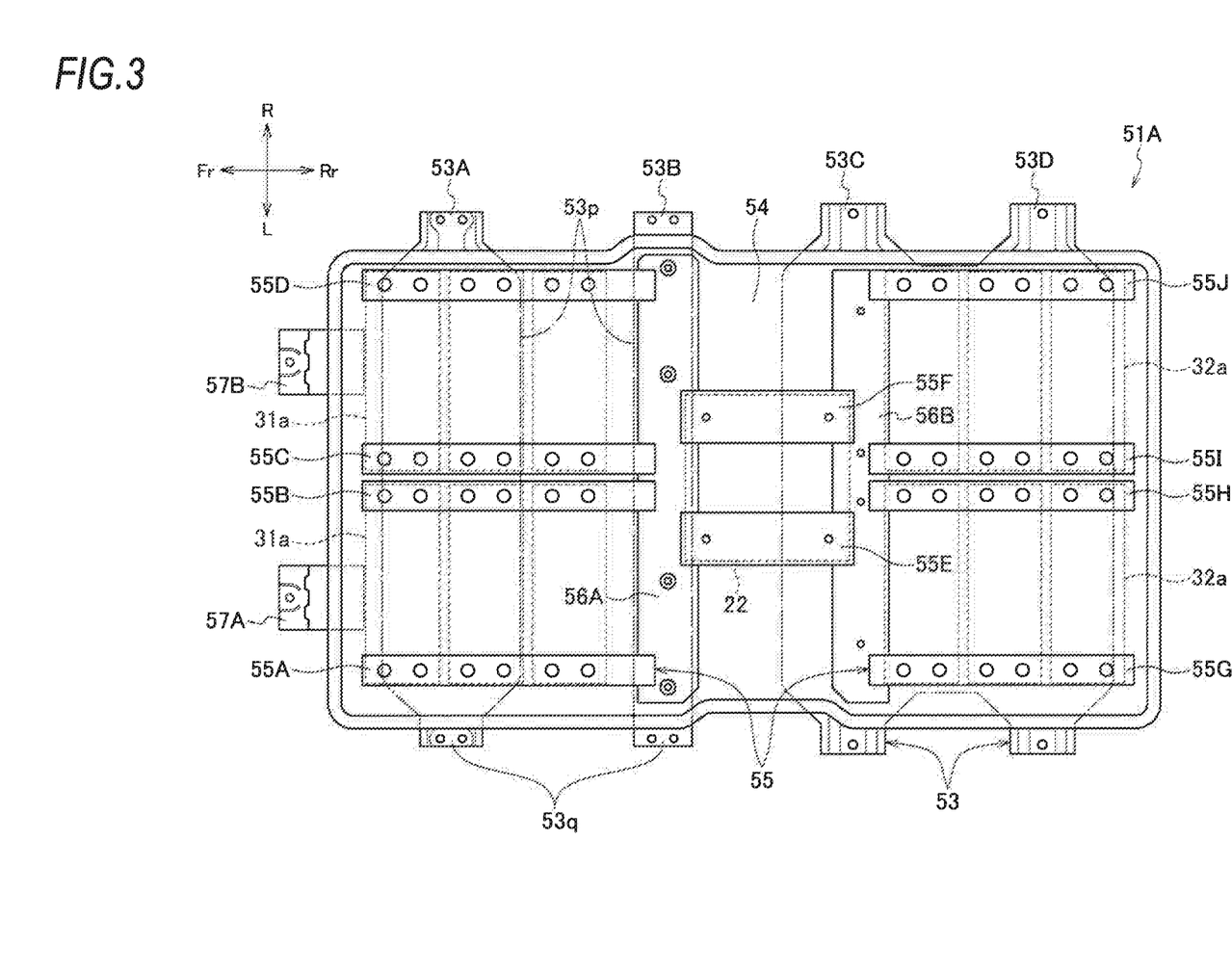
FIG. 3 is a top view illustrating a bottom plate according to the first embodiment of the present invention.
Figure 4:
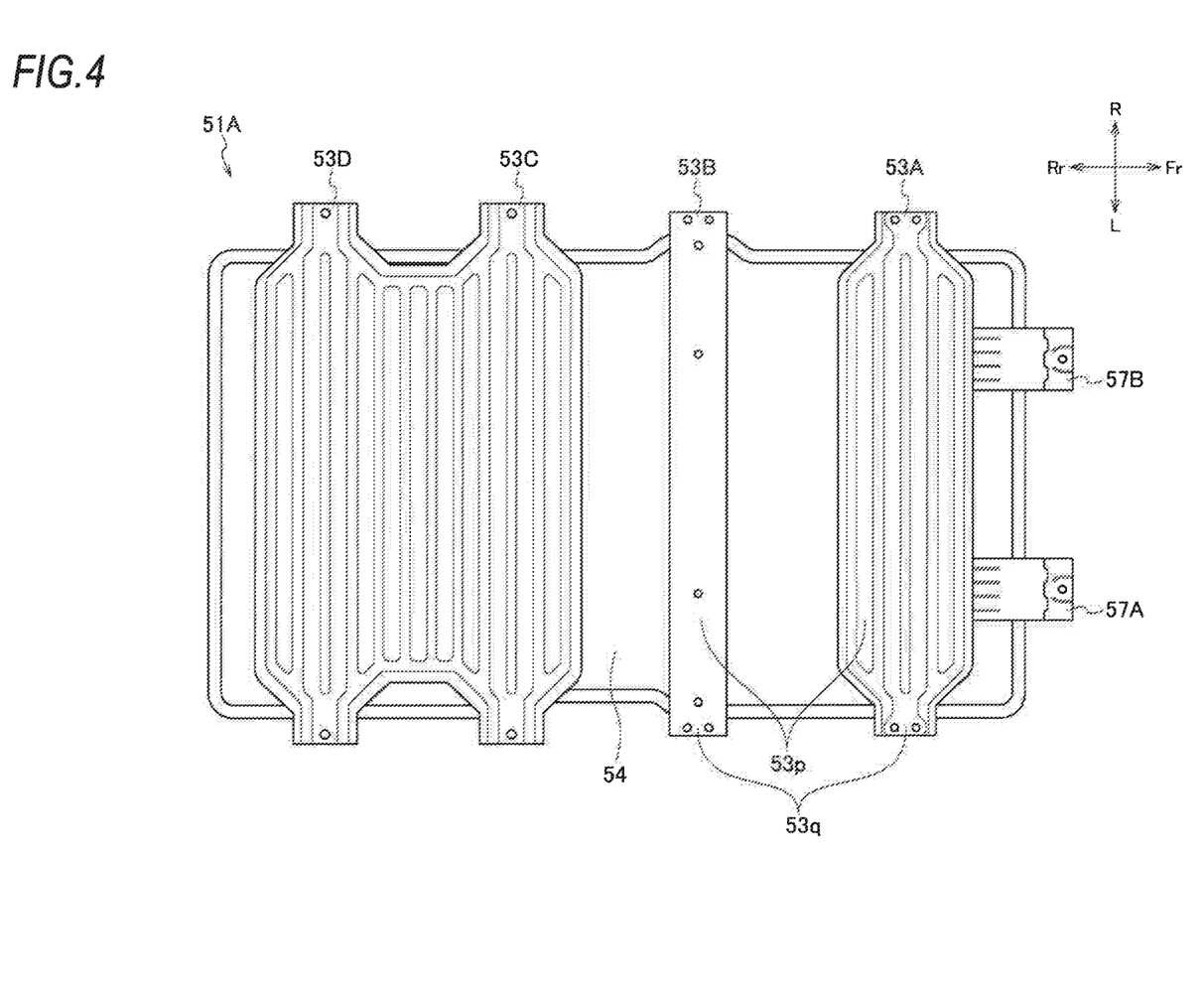
FIG. 4 is a bottom view illustrating the bottom plate according to the first embodiment of the present invention.

Next, a bottom plate 51 according to a first embodiment (hereinafter, also called a bottom plate 51A) constituting the battery case 50 will be described in detail with reference to FIGS. 3 and 4. FIG. 3 is a top view illustrating the bottom plate 51A, and FIG. 4 is a bottom view illustrating the bottom plate 51A.

The bottom plate 51A includes: a tray 54 that is disposed under the high-voltage batteries 31*a* to 33*a*; a plurality of lengthwise reinforcing members 55 that are fixed to an upper surface of the tray 54 and that extend in a front-rear-direction of the vehicle V; and a plurality of brackets 53 that are fixed to a lower surface of the tray and that extend in a vehicle width direction of the vehicle V. The brackets 53 reinforce the tray 54 as the lateral reinforcing members, and are fastened to the floor frame (not illustrated) as described above. A pair of front brackets 57A and 57B are fixed to the front of the tray 54, and the front brackets 57A and 57B are fixed to a cross member (not illustrated) that connect left and right side sills.

The tray 54 has a substantially rectangular shape and is formed by press-forming a sheet material. The tray 54 protects the high-voltage batteries 31*a* to 33*a*, the DC-DC converter 22, the battery ECU 40, and the like, which are accommodated, together with the cover 52 from water or foreign materials. It is not necessary that the tray 54 itself have high rigidity.

Each of the brackets 53 includes: a bracket main body 53*p* that extends to a region below the tray 54 in the left-right direction and that is fixed to the tray 54 by spot welding or the like; and bracket fastening portions 53*q* that are horizontally exposed from the tray 54 to opposite left and right end portions of the bracket main body 53*p*. The brackets 53 include four brackets in total including a first bracket 53A, a second bracket 53B, a third bracket 53C, and a fourth bracket 53D in order from the front. The bracket main body 53*p* of the third bracket 53C and the bracket main body 53*p* of the fourth bracket 53D are integrally formed. The bracket fastening portions 53*q* of the first bracket 53A to the fourth bracket 53D are disposed at substantially regular intervals in the front-rear-direction so as to hold the tray 54 with a good balance.

Each of the first bracket 53A, the third bracket 53C, and the fourth bracket 53D is formed such that the bracket main body 53*p* is wider than that the bracket fastening portions 53*q*. The second bracket 53B is formed such that the bracket fastening portions 53*q* and the bracket main body 53*p* have substantially the same width. Accordingly, the width of the bracket main body 53*p* of the second bracket 53B is narrower than the widths of the bracket main bodies 53*p* of the other brackets 53A, 53C, and 53D.

The lengthwise reinforcing members 55 are provided above the tray 54, that is, on a side opposite to the brackets 53 with the tray 54 interposed therebetween. Four first to fourth front lengthwise reinforcing members 55A to 55D are disposed so as to connect the first bracket 53A and the second bracket 53B. Two first and second middle lengthwise reinforcing members 55E and 55F are disposed so as to connect the second bracket 53B and the third bracket 53C. Further, four first to fourth rear lengthwise reinforcing members 55G to 55J are disposed so as to connect the third bracket 53C and the fourth bracket 53D.

The first front lengthwise reinforcing member 55A and the first rear lengthwise reinforcing member 55G are disposed at a left end of the tray 54. The fourth front lengthwise reinforcing member 55D and the fourth rear lengthwise reinforcing member 55J are disposed at a right end of the tray 54. The second front lengthwise reinforcing member 55B and the second rear lengthwise reinforcing member 55H are disposed at the left center of the tray 54 apart from the first front lengthwise reinforcing member 55A and the first rear lengthwise reinforcing member 55G. The third front lengthwise reinforcing member 55C and the third rear lengthwise reinforcing member 55I are disposed at the right center of the tray 54 apart from the fourth front lengthwise reinforcing member 55D and the fourth rear lengthwise reinforcing member 55J. Accordingly, in the front portion of the tray 54, the second and third front lengthwise reinforcing members 55B and 55C are disposed adjacent to each other. In the rear portion of the tray 54, the second and third rear lengthwise reinforcing members 55H and 55I are disposed adjacent to each other.

The first middle lengthwise reinforcing member 55E is provided between the first front lengthwise reinforcing member 55A and the first rear lengthwise reinforcing member 55G, and the second front lengthwise reinforcing member 55B and the second rear lengthwise reinforcing member 55H in the vehicle width direction so as to be positioned near the second front lengthwise reinforcing member 55B and the second rear lengthwise reinforcing member 55H. The second middle lengthwise reinforcing member 55F is provided between the fourth front lengthwise reinforcing member 55D and the fourth rear lengthwise reinforcing member 55J, and the third front lengthwise reinforcing member 55C and the third rear lengthwise reinforcing member 55I in the vehicle width direction so as to be positioned near the third front lengthwise reinforcing member 55C and the third rear lengthwise reinforcing member 55I.

The brackets 53 and the lengthwise reinforcing members 55 disposed as described above form a lattice shape with the tray 54 interposed therebetween and secure the rigidity of the bottom plate 51A. In addition, above the tray 54, in order to further improve the rigidity, a front cross member 56A is provided along the second bracket 53B so as to be fixed to rear end portions of the first to fourth front lengthwise reinforcing members 55A to 55D and front end portions of the first and second middle lengthwise reinforcing members 55E and 55F and to overlap with the second bracket 53B in a top view. A rear cross member 56B is provided along the third bracket 53C so as to be fixed to rear end portions of the first and second middle lengthwise reinforcing members 55E and 55F and front end portions of the first to fourth rear lengthwise reinforcing members 55G to 55J and to overlap with the third bracket 53C in a top view. The second bracket 53B and the third bracket 53C are fastened to the front cross member 56A and the rear cross member 56B, respectively, by bolts penetrating the tray 54 and nuts to form closed sections. As a result, the rigidity of the bottom plate 51A is further improved.

The high-voltage batteries 31a constituting the front battery module 31 are fixed between the first front lengthwise reinforcing member 55A and the second front lengthwise reinforcing member 55B and between the third front lengthwise reinforcing member 55C and the fourth front lengthwise reinforcing member 55D such that a longitudinal direction thereof faces the vehicle width direction. In addition, the high-voltage batteries 32a constituting the lower rear battery module 32 are fixed between the first rear lengthwise reinforcing member 55G and the second rear lengthwise reinforcing member 55H and between the third rear lengthwise reinforcing member 55I and the fourth rear lengthwise reinforcing member 55J such that a longitudinal direction thereof faces the vehicle width direction. Further, the DC-DC converter 22 is fixed between the first and second middle lengthwise reinforcing members 55E and 55F.

Regarding the respective high-voltage batteries 31a and 32a, a plurality of battery cells are held by a rectangular frame member although not illustrated in the drawing. Therefore, the lengthwise reinforcing members 55 are connected on the tray 54 through the frame member. Accordingly, substantially a pair of lateral reinforcing members are vertically formed on the tray 54, and thus the high-voltage batteries 31a and 32a (battery cells) are held with a high strength.

On the bottom plate 51A having the above-described configuration, three high-voltage batteries 31a are disposed in the front-rear-direction between the first front lengthwise reinforcing member 55A and the second front lengthwise reinforcing member 55B that connect the first bracket 53A and the second bracket 53B, and three high-voltage batteries 31a are also disposed in the front-rear-direction between the third front lengthwise reinforcing member 55C and the fourth front lengthwise reinforcing member 55D that connect the first bracket 53A and the second bracket 53B. As a result, the front battery module 31 is constituted by the six high-voltage batteries 31a in total. In addition, three high-voltage batteries 32a are disposed in the front-rear-direction between the first rear lengthwise reinforcing member 55G and the second rear lengthwise reinforcing member 55H that connect the third bracket 53C and the fourth bracket 53D, and three high-voltage batteries 32a are also disposed in the front-rear-direction between the third rear lengthwise reinforcing member 55I and the fourth rear lengthwise reinforcing member 55J that connect the third bracket 53C and the fourth bracket 53D. As a result, the lower rear battery module 32 is constituted by the six high-voltage batteries 32a in total. The high-voltage batteries 33a constituting the upper rear battery module 33 are disposed on the left and right high-voltage batteries 32a of the most front portion of the lower rear battery module 32.

In the space portion 34 between the front battery module 31 and the lower rear battery module 32, the DC-DC converter 22 is disposed on the first and second middle lengthwise reinforcing members 55E and 55F that are fixed to the front cross member 56A and the rear cross member 56B.

As described above, according to the embodiment, the lengthwise reinforcing members 55 and the brackets 53 are disposed in a lattice shape with the tray 54 interposed therebetween. As a result, the rigidity of the bottom plate 51A can be improved without increasing the thickness of the tray 54 or without imparting rigidity to the tray 54, and thus the structural simplification and weight reduction of the tray 54 can be realized. In addition, the high-voltage batteries 31a to 33a can be reliably held by the lengthwise reinforcing members 55 that connect the brackets 53. Further, the brackets 53 not only function as reinforcing members but also function as a fastening member. As a result, the battery unit 10 can be fixed under the floor of the vehicle V through the bracket 53, the number of components can be reduced, and the assembly can be easily performed, as compared to a case where a fastening member is separately provided. In addition, the high-voltage batteries 31a to 33a are covered with the battery case 50 including the bottom plate 51A and the cover 52. As a result, the high-voltage batteries 31a to 33a disposed under the floor can be protected from water or foreign materials.

In addition, the front battery module 31 is disposed between the first bracket 53A and the second bracket 53B, and the lower rear battery module 32 and the upper rear battery module 33 are disposed between the third bracket 53C and the fourth bracket 53D. As a result, the high-voltage batteries 31a to 33a can be held in a lattice-shaped space with high rigidity.

The third bracket 53C and the fourth bracket 53D that hold the lower rear battery module 32 and the upper rear battery module 33 having a larger capacity than the front battery module 31 are integrally formed. As a result, the lower rear battery module 32 and the upper rear battery module 33 having a large capacity can be reliably held.

In addition, in the battery unit 10, the space portion 34 is formed between the front seat 4 and the rear seat 5. Therefore, an influence on the passenger compartment 2 can be avoided. As a result, an operation of a passenger of the rear seat 5 putting a foot into or out from under the front seat 4 is not interrupted, and the passenger comfort can be secured.

In addition, the DC-DC converter 22 that is fixed to the first and second middle lengthwise reinforcing members 55E and 55F is interposed between the front battery module 31 and the lower rear battery module 32 in the front-rear-direction. Therefore, the DC-DC converter 22 can be effectively protected from impact during collision or the like.

In addition, the DC-DC converter 22 can be more reliably protected by the front cross member 56A and the rear cross member 56B that are disposed on the upper surface of the tray 54. In addition, the rigidity of the bottom plate 51A can be further improved by the front cross member 56A and the rear cross member 56B.

In addition, the front cross member 56A and the second bracket 53B form a closed space, and the rear cross member 56B and the third bracket 53C form a closed space. As a result, the high-voltage batteries 31a to 33a and the DC-DC converter 22 can be more reliably held with high rigidity.

Second Embodiment

Figure 5:
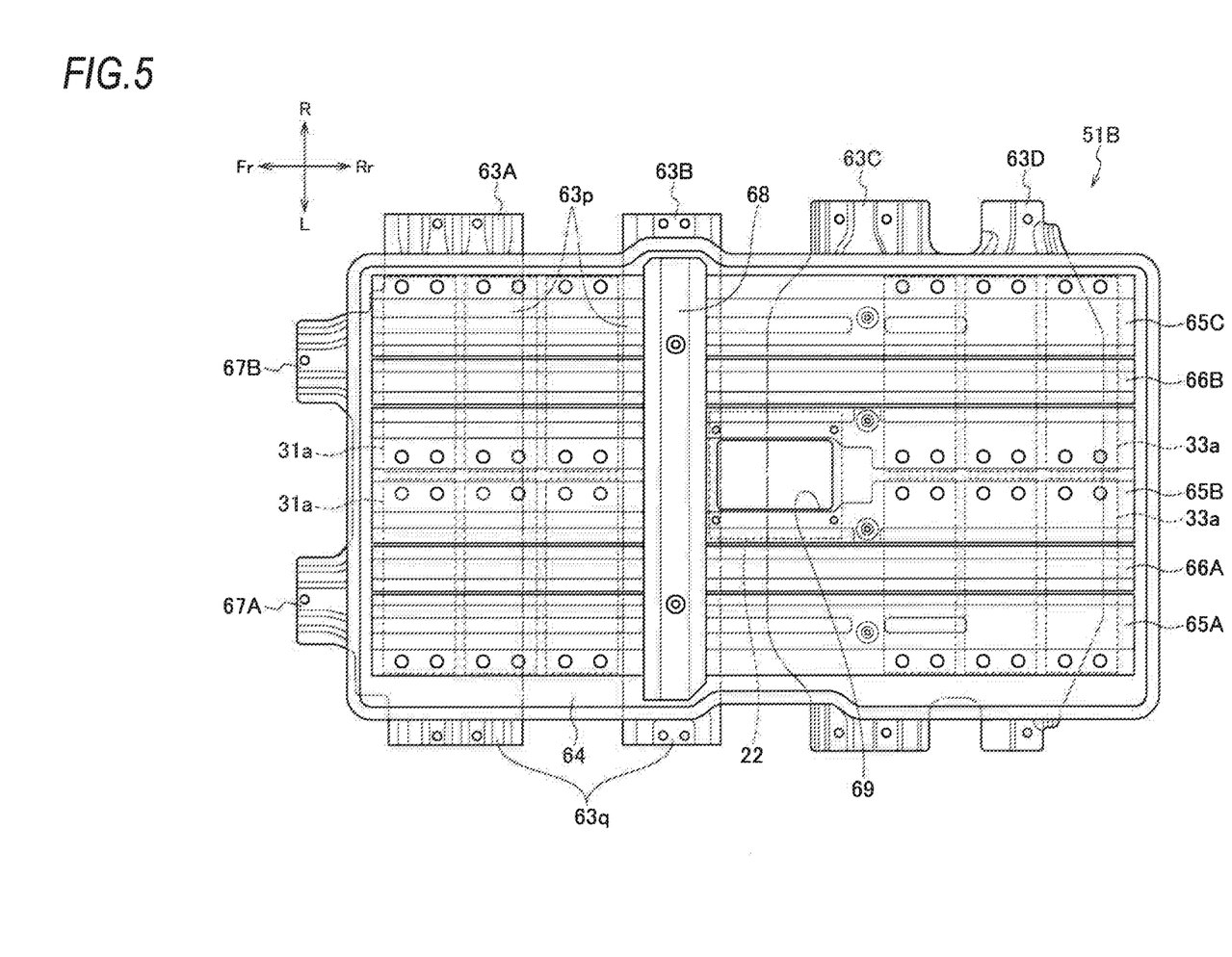
FIG. 5 is a top view illustrating a bottom plate according to a second embodiment of the present invention.
Figure 6:
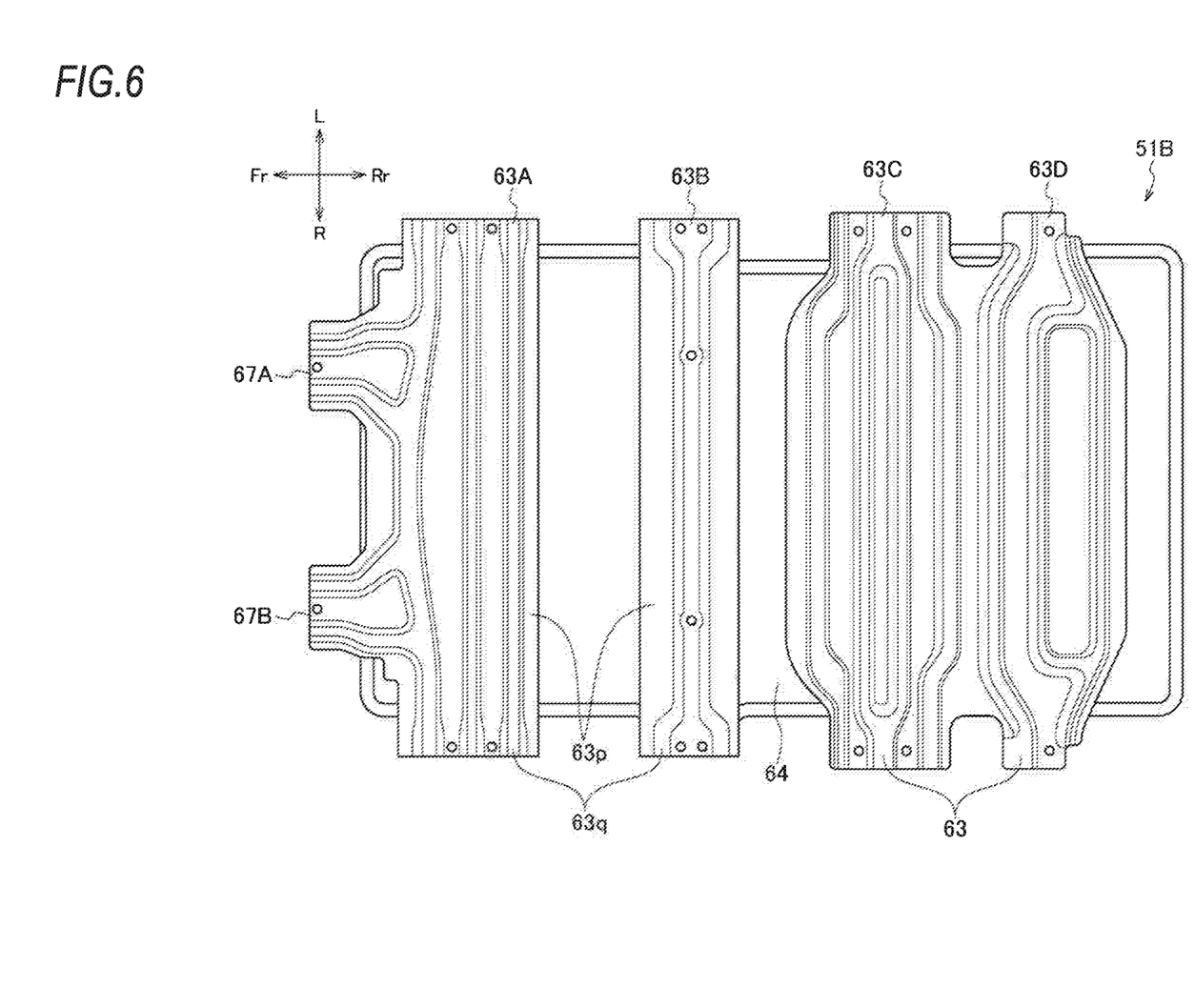
FIG. 6 is a bottom view illustrating the bottom plate according to the second embodiment of the present invention.
Figure 7:
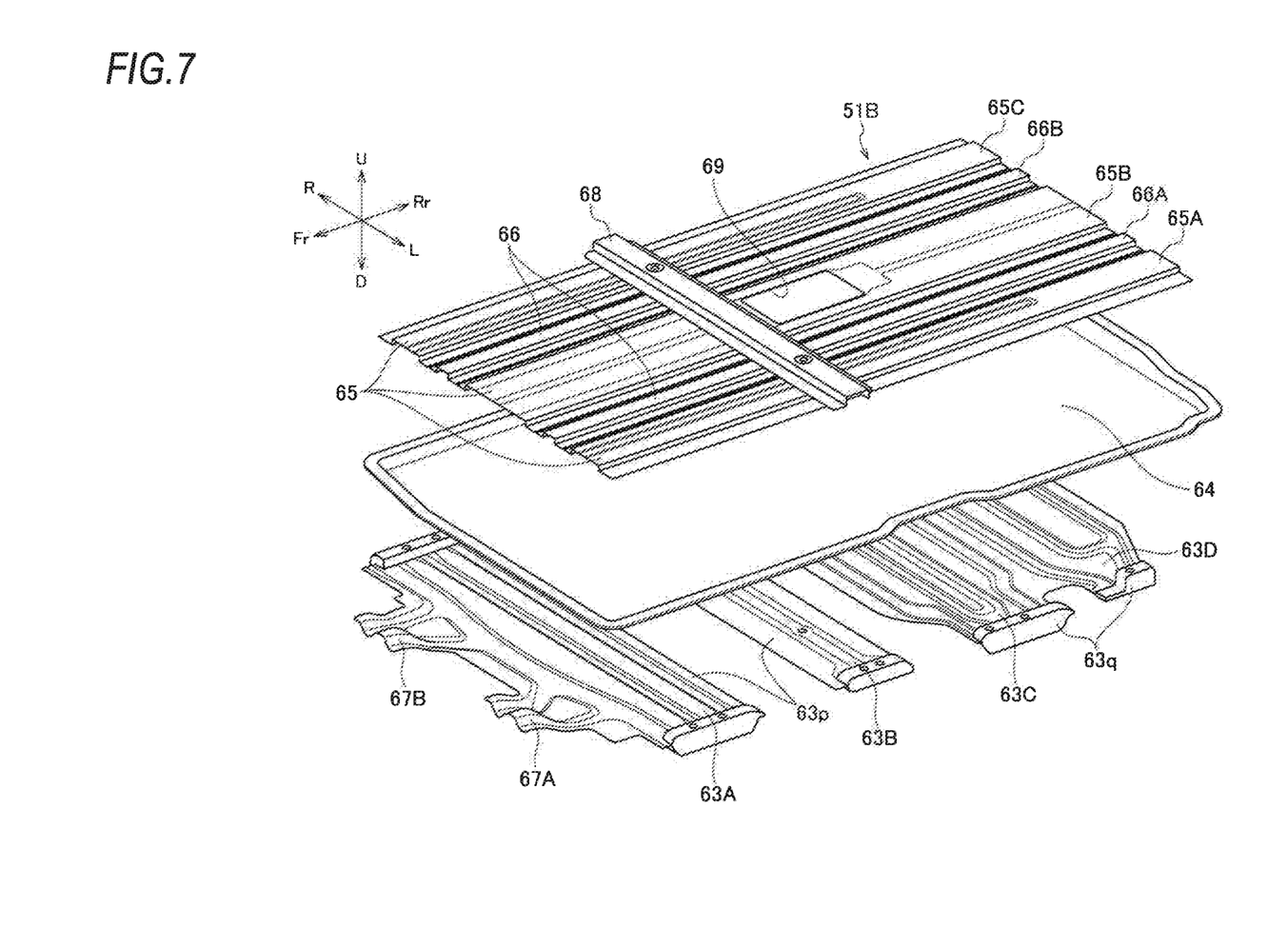
FIG. 7 is an exploded perspective view illustrating the bottom plate according to the second embodiment of the present invention.

Next, a bottom plate 51 according to a second embodiment (hereinafter, also called a bottom plate 51B) constituting a battery case 50 will be described in detail with reference to FIGS. 5 and 7. FIG. 5 is a top view illustrating the bottom plate 51B, FIG. 6 is a bottom view illustrating the bottom plate 51B, and FIG. 7 is an exploded perspective view illustrating the bottom plate 51B.

The bottom plate 51B mainly includes: a tray 64 that is disposed under high-voltage batteries 31a to 33a; a plurality of lengthwise reinforcing members 65 that are fixed to an upper surface of the tray 64 and that extend in a front-rear-direction of a vehicle V; and a plurality of brackets 63 that are fixed to a lower surface of the tray and that extend in a vehicle width direction of the vehicle V. The brackets 63 reinforce the tray 64 as the lateral reinforcing members, and are fastened to the floor frames (not illustrated) as described above.

The tray 64 has a substantially rectangular shape and is formed by press-forming a sheet material. The tray 64 protects the high-voltage batteries 31*a* to 33*a*, the DC-DC converter 22, the battery ECU 40, and the like, which are accommodated, together with the cover 52 from water or foreign materials. It is not necessary that the tray 54 itself have high rigidity.

Each of the brackets 63 includes: a bracket main body 63*p* that extends to a region below the tray 64 in the left-right direction and that is fixed to the tray 64 by spot welding or the like; and bracket fastening portions 63*q* that are horizontally exposed from the tray 64 to opposite left and right end portions of the bracket main body 63*p*. The brackets 63 include four brackets in total including a first bracket 63A, a second bracket 63B, a third bracket 63C, and a fourth bracket 63D in order from the front. The bracket main body 63*p* of the third bracket 63C and the bracket main body 63*p* of the fourth bracket 63D are integrally formed. The bracket fastening portions 63*q* of the first bracket 63A to the fourth bracket 63D are disposed at substantially regular intervals in the front-rear-direction so as to hold the tray 64 with a good balance. A pair of front brackets 67A and 67B are integrally formed to the front of the first bracket 63A, and the front brackets 67A and 67B are fixed to a cross member (not illustrated) that connects left and right side sills.

Each of the first bracket 63A, the third bracket 63C, and the fourth bracket 63D is formed such that the bracket main body 63*p* is wider than the bracket fastening portions 63*q*. The second bracket 63B is formed such that the bracket fastening portions 63*q* and the bracket main body 63*p* have substantially the same width. Accordingly, the width of the bracket main body 63*p* of the second bracket 63B is narrower than the widths of the bracket main bodies 63*p* of the other brackets 63A, 63C, and 63D.

The lengthwise reinforcing members 65 are provided above the tray 64, that is, on a side opposite to the brackets 63 with the tray 64 interposed therebetween. Three first to third lengthwise reinforcing members 65A to 65C are disposed so as to connect the first bracket 63A to the fourth bracket 63D. The first lengthwise reinforcing member 65A is disposed at a left end of the tray 64, the second lengthwise reinforcing member 65B is disposed at the center of the tray 64, and the third lengthwise reinforcing member 65C is disposed at a right end of the tray 64.

The brackets 63 and the lengthwise reinforcing members 65 disposed as described above form a lattice shape with the tray 64 interposed therebetween and secure the rigidity of the bottom plate 51B. In addition, above the tray 64, in order to further improve the rigidity, a subsidiary lengthwise reinforcing ember 66 and a cross member 68 are provided.

The subsidiary lengthwise reinforcing member 66 includes two members, that is first and second subsidiary lengthwise reinforcing members 66A and 66B. The first and second subsidiary lengthwise reinforcing members 66A and 66B are disposed so as to connect the first bracket 63A to the fourth bracket 63D. The first subsidiary lengthwise reinforcing member 66A is disposed between the first lengthwise reinforcing member 65A and the second lengthwise reinforcing member 65B, and the second subsidiary lengthwise reinforcing member 66B is disposed between the second lengthwise reinforcing member 65B and the third lengthwise reinforcing member 65C.

The cross member 68 is provided so as to cross the first to third lengthwise reinforcing members 65A to 65C and the first and second subsidiary lengthwise reinforcing members 66A and 66B. In addition, the cross member 68 is provided along the second bracket 63B so as to overlap with the second bracket 63B in a top view. The second bracket 63B and the cross member 68 are fastened through the tray 64 and form a closed section. As a result, the rigidity of the bottom plate 51B is further improved. This way, the second bracket 63B can secure the rigidity in cooperation with the cross member 68. Therefore, the width of the bracket main body 63*p* of the second bracket 63B is narrower than those of the other brackets 63A, 63C, and 63D. In other words, the brackets 63A, 63C, and 63D that are not fastened to the cross member 68 improve the rigidity of the brackets themselves by setting the widths of the bracket main bodies 63*p* to be wider.

The high-voltage batteries 31*a* constituting the front battery module 31 and the high-voltage batteries 32*a* constituting the lower rear battery module 32 are fixed between the first lengthwise reinforcing member 65A and the second lengthwise reinforcing member 65B and between the second lengthwise reinforcing member 65B and the third lengthwise reinforcing member 65C such that a longitudinal direction thereof faces the vehicle width direction. Further, the DC-DC converter 22 is fixed substantially at the center of the second lengthwise reinforcing member 65B in the front-rear-direction.

Regarding the respective high-voltage batteries 31*a* and 32*a*, a plurality of battery cells are held by a rectangular frame member although not illustrated in the drawing. Therefore, the lengthwise reinforcing members 65 are connected on the tray 64 through the frame member. Accordingly, substantially a pair of lateral reinforcing members are vertically formed on the tray 64, and thus the high-voltage batteries 31*a* and 32*a* (battery cells) are held with a high strength.

On the bottom plate 51B having the above-described configuration, three high-voltage batteries 31*a* are disposed in front of the cross member 68 in the front-rear-direction between the first lengthwise reinforcing member 65A and the second lengthwise reinforcing member 65B that connect the first bracket 63A to the fourth bracket 63D, and three high-voltage batteries 31*a* are also disposed in the front-rear-direction between the second lengthwise reinforcing member 65B and the third lengthwise reinforcing member 65C that connect the first bracket 63A to the fourth bracket 63D. As a result, the front battery module 31 is constituted by the six high-voltage batteries 31*a* in total. In addition, three high-voltage batteries 32*a* are disposed in rear of and apart from the cross member 68 in the front-rear-direction between the first lengthwise reinforcing member 65A and the second lengthwise reinforcing member 65B that connect the first bracket 63A to the fourth bracket 63D, and three high-voltage batteries 32*a* are also disposed in the front-rear-direction between the second lengthwise reinforcing member 65B and the third lengthwise reinforcing member 65C that connect the first bracket 63A to the fourth bracket 63D. As a result, the front battery module 31 is constituted by the six high-voltage batteries 32*a* in total. The high-voltage batteries 33*a* constituting the upper rear battery module 33 are disposed on the left and right high-voltage batteries 32*a* of the most front portion of the lower rear battery module 32.

In the space portion 34 between the front battery module 31 and the lower rear battery module 32, the DC-DC converter 22 is disposed on the second lengthwise reinforcing member 65B that is fixed to the cross member 68. In the second lengthwise reinforcing member 65B, a hole portion 69 is provided in a part of a region where the DC-DC converter 22 is disposed, and a space that is formed by the lengthwise reinforcing members 65 and the tray 64 is connected to the DC-DC converter 22 through the hole portion 69. As a result, a harness (not illustrated) that is routed in the space is connected to the DC-DC converter 22 through the hole portion 69. By providing the hole portion 69 in the second lengthwise reinforcing member 65B as described above, the space formed by the lengthwise reinforcing members 65 and the tray 64 can be effectively used as a harness accommodation space, and the DC-DC converter 22 can be disposed compactly in the height direction.

As described above, according to the embodiment, the lengthwise reinforcing members 65 and the brackets 63 are disposed in a lattice shape with the tray 64 interposed therebetween. As a result, the rigidity of the bottom plate 51B can be improved without increasing the thickness of the tray 64 or without imparting rigidity to the tray 64, and thus the structural simplification and weight reduction of the tray 64 can be realized. In addition, the high-voltage batteries 31a to 33a can be reliably held by the lengthwise reinforcing members 65 that connect the brackets 63. Further, the brackets 63 not only function as reinforcing members but also function as a fastening member. As a result, the battery unit 10 can be fixed under the floor of the vehicle V through the bracket 53, the number of components can be reduced, and the assembly can be easily performed, as compared to a case where a fastening member is separately provided.

In addition, the front battery module 31 is disposed between the first bracket 63A and the second bracket 63B, and the lower rear battery module 32 and the upper rear battery module 33 are disposed between the third bracket 63C and the fourth bracket 63D. As a result, the high-voltage batteries 31a to 33a can be held in a lattice-shaped space with high rigidity.

The third bracket 63C and the fourth bracket 63D that hold the lower rear battery module 32 and the upper rear battery module 33 having a larger capacity than the front battery module 31 are integrally formed. As a result, the lower rear battery module 32 and the upper rear battery module 33 having a large capacity can be reliably held.

In addition, in the battery unit 10, the space portion 34 is formed between the front seat 4 and the rear seat 5. Therefore, an influence on the passenger compartment 2 can be avoided. As a result, an operation of a passenger of the rear seat 5 putting a foot into or out from under the front seat 4 is not interrupted, and the passenger comfort can be secured.

In addition, the DC-DC converter 22 that is fixed to the second lengthwise reinforcing member 65B is interposed between the front battery module 31 and the lower rear battery module 32 in the front-rear-direction. Therefore, the DC-DC converter 22 can be effectively protected from impact during collision or the like.

In addition, the DC-DC converter 22 can be more reliably protected by the cross member 68 that is disposed on the upper surface of the tray 54. In addition, the rigidity of the bottom plate 51B can be further improved by the cross member 68.

In addition, the closed space is formed between the cross member 68 and the second bracket 53B. As a result, the high-voltage batteries 31a to 33a and the DC-DC converter 22 can be more reliably held with high rigidity.

The present invention is not limited to the above-described embodiments, and modifications, improvements, and the like can be appropriately made.

For example, the shapes, numbers, and the like of the lengthwise reinforcing members 55 (65) and the brackets 53 (63) can be appropriately changed as long as the lengthwise reinforcing members 55 (65) and the brackets 53 (63) are disposed in a lattice shape with the tray 54 (64) interposed therebetween.

In addition, the DC-DC converter 22 is used as the example of the high-voltage device. However, it is not necessary that the battery unit 10 include a high-voltage device. In addition, another high-voltage device may be provided instead of or in addition to the DC-DC converter 22.

DESCRIPTION OF REFERENCE NUMERALS AND CHARACTERS 4 front seat
5 rear seat
10 battery unit (vehicle battery unit)
22 DC-DC converter (high-voltage device)
31 front battery module (first battery module)
31a to 33a high-voltage battery (battery)
32 lower rear battery module (second battery module)
50 battery case
51A, 51B bottom plate
52 cover
53, 63 bracket
54, 64 tray
55, 65 lengthwise reinforcing member
56A front cross member (cross member)
56B rear cross member (cross member)
68 cross member

The invention claimed is:
1. A vehicle battery unit comprising:
a plurality of batteries; and
a battery case that accommodates the batteries,
wherein the battery case includes a bottom plate on which the batteries are mounted and a cover that covers the batteries from above,
wherein the bottom plate includes:
a tray that has a plate shape;
a plurality of lengthwise reinforcing members that have plate shapes and that are laminated on an upper surface of the tray; and
a plurality of lateral reinforcing members that have plate shapes and that are laminated on a lower surface of the tray,
wherein the lengthwise reinforcing members extend in a front-rear-direction of a vehicle,
wherein the lateral reinforcing members extend in a vehicle width direction of the vehicle,
wherein the lengthwise reinforcing members are disposed so as to connect at least adjacent lateral reinforcing members,
wherein the lengthwise reinforcing members and the lateral reinforcing members are disposed in a lattice shape with the tray interposed therebetween,
wherein the batteries are fixed to upper surfaces of the lengthwise reinforcing members such that a longitudinal direction of the batteries faces the vehicle width direction,
wherein the battery case is fixed under a floor of the vehicle by the lateral reinforcing members, wherein in the battery case, a first battery module and a second battery module that include the batteries are disposed apart from each other in the front-rear-direction with a space portion interposed therebetween, wherein a front seat is disposed above the first battery module, wherein a rear seat is disposed above the second battery module, wherein each of the first battery module and the second battery module is disposed between a pair of the lateral reinforcing members, wherein a DC-DC converter is disposed in the space portion, and wherein the DC-DC converter is fixed to at least one of the plurality of lengthwise reinforcing members.

2. The vehicle battery unit according to claim 1, wherein a pair of the lateral reinforcing members are provided in a front-rear-direction of the DC-DC converter, wherein at least one cross member is provided on the upper surface of the tray, each cross member being provided along one of the pair of the lateral reinforcing members, and wherein the at least one lengthwise reinforcing member that holds the DC-DC converter is fixed to the at least one cross member.

3. The vehicle battery unit according to claim 2, wherein the at least one cross member is disposed so as to overlap with the one of the pair of the lateral reinforcing members, which interpose the DC-DC converter therebetween, in a top view, and wherein a closed space is formed by the at least one cross member and the one of the pair of the lateral reinforcing members.

\* \* \* \* \*